United States Patent [19]

Decker

[11] 4,047,833
[45] Sept. 13, 1977

[54] HORIZONTAL WINDMILL

[76] Inventor: Bert J. Decker, 136 Capen Blvd., Buffalo, N.Y. 14226

[21] Appl. No.: 570,558

[22] Filed: Apr. 23, 1975

[51] Int. Cl.² ............................................. B27C 9/00
[52] U.S. Cl. .......................................... 415/2; 115/3; 416/197 A; 290/55
[58] Field of Search .................. 115/3; 290/44, 55; 415/2, 4, 36, 3; 416/117–119, 46, 50, 140, 132 B, 197 A

[56] References Cited

U.S. PATENT DOCUMENTS

| 362,557 | 5/1887 | Vanpelt et al. | 416/117 |
|---|---|---|---|
| 1,198,410 | 9/1916 | Bjornson | 416/118 |
| 1,371,204 | 3/1921 | Holt | 416/118 |
| 1,439,316 | 12/1922 | McArdle | 415/2 |
| 1,794,930 | 3/1931 | Spencer | 416/46 |
| 1,824,487 | 9/1931 | Klopsteg | 115/3 |
| 2,094,603 | 10/1937 | Keene | 416/118 |
| 3,565,546 | 2/1971 | Shanahan | 416/117 |
| 3,707,812 | 1/1973 | Roessl | 290/55 |
| 3,743,848 | 7/1973 | Strickland | 290/55 |

FOREIGN PATENT DOCUMENTS

| 598,740 | 12/1925 | France | 115/3 |
|---|---|---|---|
| 1,211,937 | 11/1970 | United Kingdom | 115/3 |

*Primary Examiner*—Trygve M. Blix
*Assistant Examiner*—Jesus D. Sotelo
*Attorney, Agent, or Firm*—Raymond F. Kramer

[57] ABSTRACT

A horizontal windmill includes a vertical tubular internal baffle member, a plurality of vanes responsive to the wind, mounted and positioned so that they revolve horizontally when the wind blows, partially rotating to resist the force of the wind in some positions during such revolution and being feathered with respect to it in other positions, and a vertical baffle located outside the path of rotation of the vanes, for increasing the wind speed as the wind is directed against the wind-resisting vanes. To secure the benefits of low cost of the structure for supporting such a windmill it is mounted on a building, with the vertical tubular member surrounding the building and being transparent to allow entry of light. In preferred embodiments of the invention various portions of the windmill are of light weight plastic material, such as the vanes and external baffles, and thin light weight tension members are employed to strengthen compression members and hold them in position. Also, to obtain most efficient wind trapping and spilling effects the vanes may be at least partially in the forms of horizontal channels or V's with the open side thereof facing the wind when the wind is in the direction the vane is moving and being of a coarser or rougher surface than the opposite side. A boat powered by such a windmill is also described.

15 Claims, 6 Drawing Figures

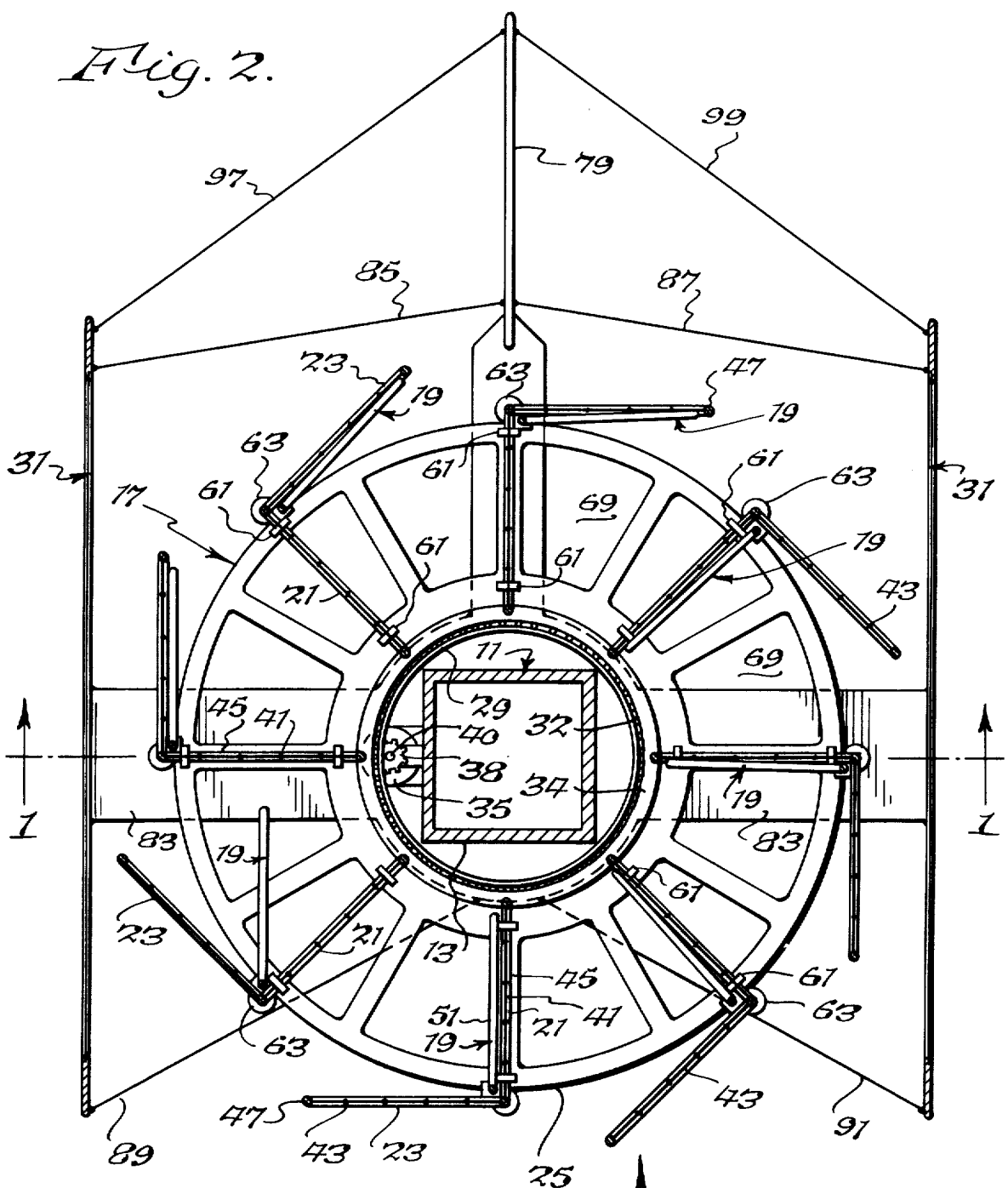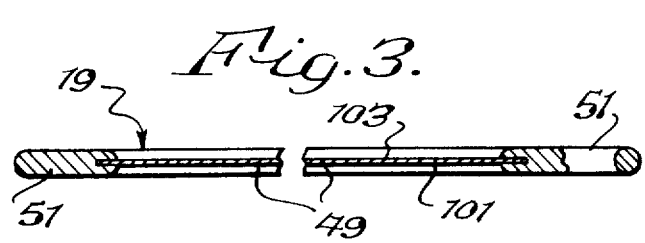

HORIZONTAL WINDMILL

This invention relates to a horizontal windmill. More particularly, it relates to such a mill with means provided to increase the effective speed of the wind drivng it, means to more effectively utilize the wind power directed onto the moving windmill surfaces, and supporting structure which is light in weight and, in some aspects of the invention, utilizes already existing structures, such as buildings, especially sides thereof, as unique mounts for a surrounding windmill structure. Additionally, the invention is also of such horizontal windmills utilized to provide a form of power to drive boats, even against the wind.

Because of the realization that there is a world-wide energy shortage which could be of long duration other sources of power than fossil fuels have recently been re-investigated. One of the most promising of such is wind power, which has been successfully employed over the ages to drive windmills operating sawmills, grist mills and electric generators. Wind power utilization also has a decided environmental advantage because it is non-polluting. One of the problems in the operation of windmills, other than lack of wind, is that the conventional Dutch mills, in which the sails rotate in a vertical plane, have to be moved to face the wind, which requires movement of the comparatively heavy sails and supporting structures used for operating large generators. Accordingly, horizontally moving windmills, which normally are always correctly oriented with respect to the wind, are preferred. Windmills of this type have been described in U.S. Pat. Nos. 469,786; 1,186,353; 1,314,232; 1,371,204; 1,524,712; 1,535,585; 1,707,507; 1,794,930; 2,006,024; 2,119,142; and 2,129,652; British Pat. No. 19,401/1891; and French Pat. Nos. 646,071; 745,869; and 913,964. Funnel or shroud means have been employed to increase air velocity to the windmill means, as in U.S. Pat. Nos. 25,269, 1,345,022; and 1,471,095, which patents also illustrate fin means to maintain the funnel or air accelerator facing into the wind. U.S. Pat. Nos. 1,345,022; 1794,930; 2,153,523; and 2,177,801 show propellors or windmills which directly and indirectly drive electrical generators and U.S. Pat. Nos. 1,650,702; 1,849,731; 2,677,344; and 3,212,470 describe various horizontally rotating wind driven means for propelling ships or boats. In that last group U.S. Pat. No. 1,849,731 also describes the charging of batteries by a generator driven by horizontally rotating windmills or wind motors.

Although some of the elements of the present invention have been disclosed in the art there is no description therein of combinations of elements resulting in the present structures. Particularly, there is no teaching of the mechanisms or structures for increasing air power and mounting of the windmill about a structure supported on the sides thereof by the use of the present lightweight components and supporting means, to generate, store and supply electricity to a building or other construction, such as a boat, on which it is supported.

In accordance with the present invention a horizontal windmill comprises a plurality of vanes, a vertical tubular internal baffle member, means for mounting and positioning the vanes so that they revolve horizontally when the wind blows and partially rotate to resist the force of the wind in some positions during such revolution and to be feathered with respect to it in other positions, so as to promote such horizontal revolution of the vanes, and means located outside the path of rotation of the vanes for increasing the windspeed as the wind is directed against the wind-resisting vanes. Preferably, the vertical tubular internal member is cylindrical and surrounds a building on which the windmill is supported, the means for increasing the wind speed as the wind is directed against the wind-resisting vanes is a substantially vertical baffle external of the rotating vanes, which baffle is self-aligning with the wind direction, and the windmill parts are of light-weight materials strengthened and held in position in at least some cases by light-weight tension members, such as wires. Other aspects of the invention will be evident from the following description, taken together with the drawing in which:

FIG. 2 is a partially sectioned plan view of such preferred embodiment of the invention along plane 2—2 of FIG. 1;

FIG. 3 is an enlarged horizontal sectional view of the end of a vane of the windmill of FIGS. 1 and 2, taken along plane 2—2 of FIG. 1;

Figure 1:
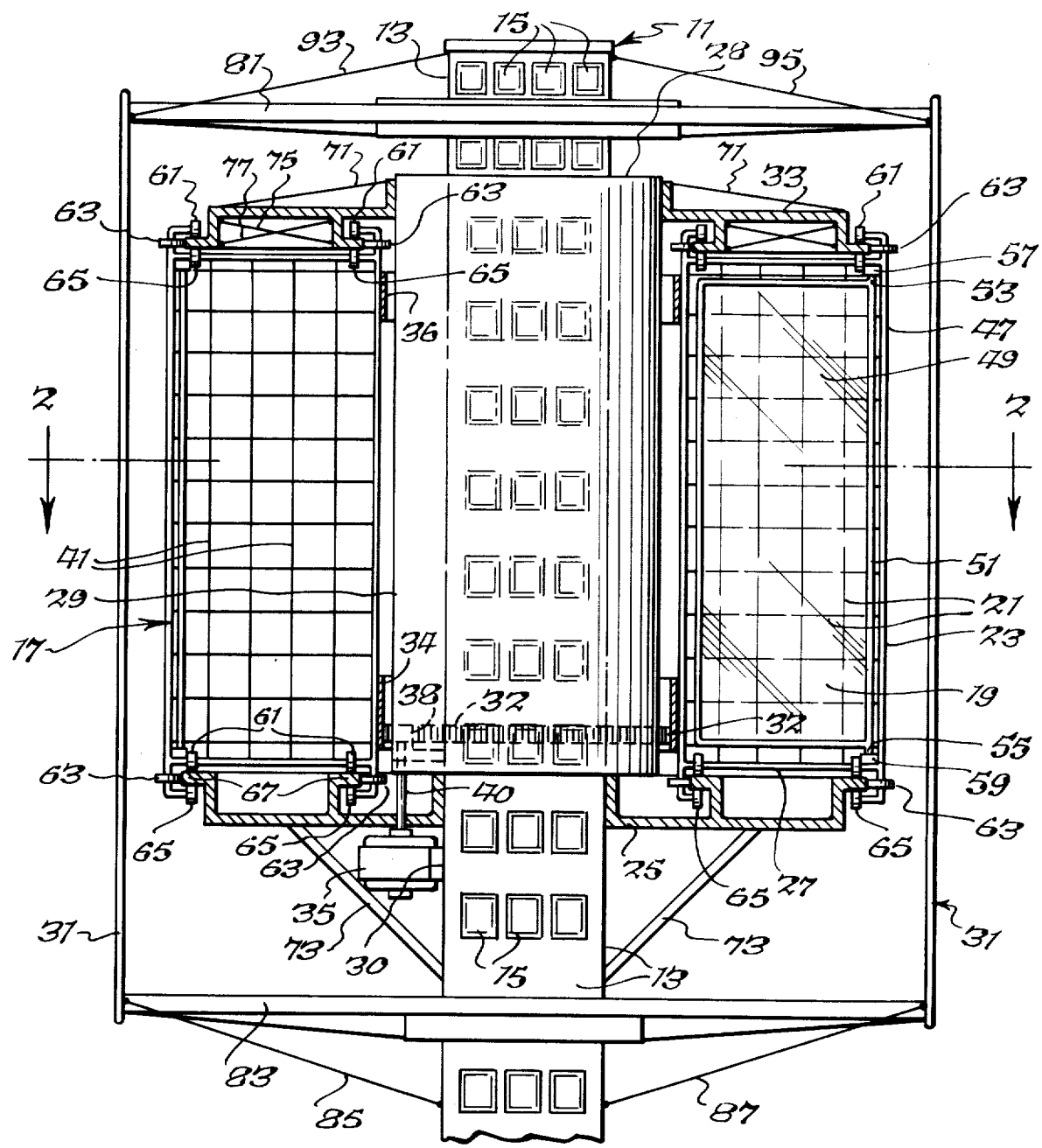
FIG. 1 is a partially sectioned elevational view of a preferred embodiment of the invention, the sectioned portion of which is along plane 1—1 of FIG. 2, with some parts removed.

Referring to FIGS. 1 and 2, numeral 11 represents a building having walls 13 and windows 15. Mounted on the building is a horizontal windmill 17 of the present invention, including a plurality of vanes 19, stop means 21 and 23 for limiting the movement of the vanes, supporting means 25 for holding connecting means or intermediate supporting means 27 for the vanes and stop means in revolvable relationship with respect to building 11, and vertical tubular internal baffle means 29 and external baffle means 31 located outside the path of rotation of the vanes, which internal and external baffle means, in combination, increase the wind speed as the wind is directed against the wind resisting vanes (those moving in the direction of the wind and powering the mill).

In operation, as illustrated in FIGS. 1 and 2, with the wind direction as indicated in FIG. 2, the windmill rotates in a counterclockwise direction, viewed from the top, as in FIG. 2, with the right side illustrated vane and stop members moving away from a viewer of FIG. 1 while those on the left side move toward him. Due to the construction of the mill, utilizing a building as a support for it and employing lightweight materials of construction, strengthened by tension members, it produces more power per unit weight and per unit cost than the traditional windmill and the power:weight and power:cost ratios increase as the size of the windmill is increased whereas with traditional mills this ratio generally decreases as the mill is made larger because more expensive heavier supports are needed. Also, because of the raising of the wind speed on the "power stroke" the present mills produce power during days of low wind velocity, e.g., 5 to 8 kilometers per hour.

Building 11, as illustrated, (usually an office building such as a "skyscraper" or a factory or warehouse building) is of square cross-section and vertical tubular internal baffle member 29, positioned about it, is of circular cross-section or cylindrical structure. The building utilized, while preferably generally tower shaped and with the windmill portion thereof being located at least 10 meters and preferably at least 90 meters above ground level, may be of other shapes and cross-sectional designs and the tubular member may be made accordingly so as to surround the building (usually being mounted so as to clear the corners by a small distance, e.g., 10 cm. to 1 m.). Normally, the tubular shape of the internal baffle will be curviform, e.g., elliptical, di-parabolic, but other shapes, even those of straight sides, e.g., octagonal, dodecagonal, may also be employed. In some instances, as when the building shape is curviform or of a regular polygonal cross-section of a sufficient number of sides, e.g., 6 to 12, (square buildings are usually not as satisfactory) the employment of an internal baffle member may be omitted but the result is a less regular wind flow and less efficient power generation from the horizontal windmill. The internal baffle member may be held to the building by various means and in some cases may not completely surround the building but an equivalent effect may be obtained, as by having a plurality of curviform members, one for each side of the building, joined to that side only but terminating near the corners thereof, so that an essentially tubular shape is produced.

Supporting member 25 extends, as illustrated in FIGS. 1 and 2, from the building to near the ends of vanes 19 away from the building. Support 25 has a counterpart member 33 above the vanes, shown fastened to the internal baffle 29, which is sufficiently strong to support member 33. However, support 33 may be fastened to the building wall instead, by piercing baffle 29 or the baffle top edge 28 may be lowered accordingly. Also, if desired, support 25 may be held to the baffle 29 or to structure supporting the baffle. In embodiments of the invention wherein the baffle 29 rotates with the vanes 19 (to be described later) the vanes, etc., may be mounted to it directly and the baffle may be mounted on a suitable support. In conjunction members 25 and 33, together with the connecting means 27 and the vane member 19 structure, maintain the vanes in desired revolving relationship with respect to the building when the wind acts on the windmill. Support 25 may also hold an electric generator 35 or other suitable power conversion means but as illustrated the generator is supported on building 11 at 30. Mounted to the moving vane stop member or frames for them (or other suitable mill parts) is internally toothed gearing or frictional drive wheel 32. This is mounted on separator or spacer 34 which, with similar spacer 36, holds the vanes and stops for them in desired spaced position. Gearing 32 drives spur gear 38 and through it shaft 40 to power generator 35. The generator is connected via transmission wires, not shown, to the interior of the building which it supplies with at least some of the building requirement for electricity and in which excess electricity is stored in batteries, not illustrated, for future use, with intermediate rectification sometimes being employed. Alternatively, the power may be stored in the form of heat, generated from the electricity, and may be used as such when desired or may be reconverted to electricity. Also energy storage may be by flywheel means, which may be mechanically or electrically connected to the drive 32.

Vane member 19 is held to intermediate supporting means 27, which also holds stops 21 and 23. Stop 21 is positioned radially and stop 23 is held tangentially at 90° to stop 21. both, as illustrated, include wire screening or "fish net" structures which allow the passage of air except when vane 19 bears against such a stop member. The wires, filaments or cords 41 and 43 of the stop members, respectively, are held under tension in frames 45 and 47. Vane member 19 may be considered to include a sheet, film, cloth or other suitable air blocking portion 49 and frame 51. The frame has projections 53 and 55 at the upper and lower outer ends thereof which fit in bearings 57 and 59, respectively, thus allowing the vanes to swing between stop positions as they are acted on by the wind.

Intermediate support or connecting means 27 includes a plurality of bottom rollers 61 which support the stop members and the vanes by riding on the top surface of support 25. Three-way roller structures including rollers 63 and 65 are present, two such combinations at each of the bottoms and tops of the stop members 21 joined to the frames 45 thereof. Such structures prevent lifting or removal of the vane-stop assemblies during use, which is especially important in times of high winds. The triple wheel structures ride on flanges 67 of member 25 and on corresponding flanges elsewhere on the same member and corresponding support 33.

In the interest of maintaining the structure as light as possible supporting members 25 and 33 have open sections therein, as at 69 and these compression members are further strengthened by the use of tension members 71 and corresponding light compression or tension members 73 fastened to the building. Similar tension members 75 and 77 perform an additional strengthening function with respect to the counterpart supporting member 33.

In order to increase wind velocity and thereby increase the power obtainable from a horizontal windmill of a certain size external baffle means 31 is provided. As illustrated, such means is a vertical flat member extending from below the moving elements of the windmill to above them, usually with the "overlap" distance being at least 10% of the height of the windmill vanes and preferably 25 to 60% thereof. Baffle 31 will normally be located from 0.2 to 1 meter outside the maximum diameter of revolution of the stop member 23. Although illustrated as a flat vertical member baffle 31 may be of other suitable shapes, such as curves, arcs of circles and portions of polygon walls. A guide to shape selection is that the shape should be such as to cause an increase in wind velocity (a decrease in cross-sectional area at the point of maximum wind thrust on the windmill vane). As illustrated, a pair of baffle members 31 is shown with a fin or rudder 79, all of which are joined to upper and lower frameworks 81 and 83, respectively, which are held to building 11. Additionally, tension wires 85, 87, 89, 91, 93, 95, 97 and 99 hold the baffles and fin in desired parallel relationship. The structure illustrated provides a balanced self-aligning effect for the baffles so as to have them facing in the direction of the wind at all times. With the balancing effect of both baffles 31 there is a lesser tendency for vibration or binding of the baffles against movement with wind changes and there is a greater responsiveness to the wind so that the baffles trap the maximum amount of wind at all times. However, by the elimination of the left baffle greater efficiency in operation may be produced because of the diminution of the wind velocity on the side of the mill wherein the vanes are moving in a direction opposite to the wind. In some embodiments of the invention, not illustrated, an additional baffle may be employed in front of the mill, shutting off wind to the left side vanes which are moving against the wind. This will decrease the force of the wind opposing such movement and can result in increased efficiencies.

Figure 5:
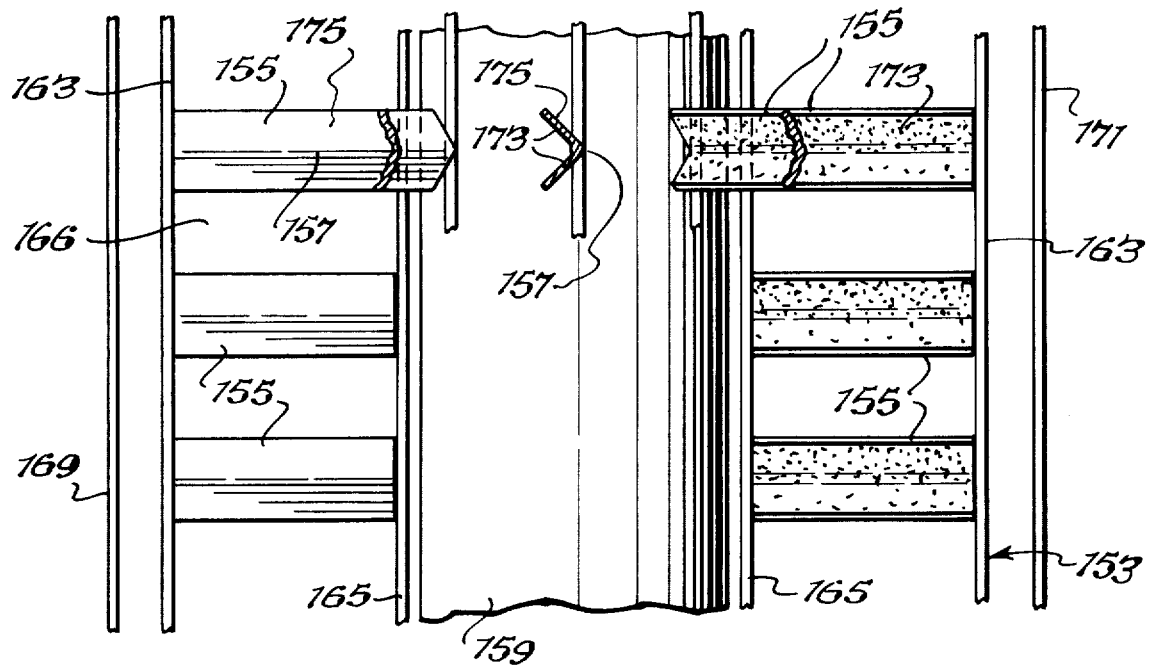
FIG. 5 is a partially sectioned partial elevational view of a modifiction of the windmill of FIGS. 1-3 viewed along cutting plane 5—5 of FIG. 6.
Figure 6:
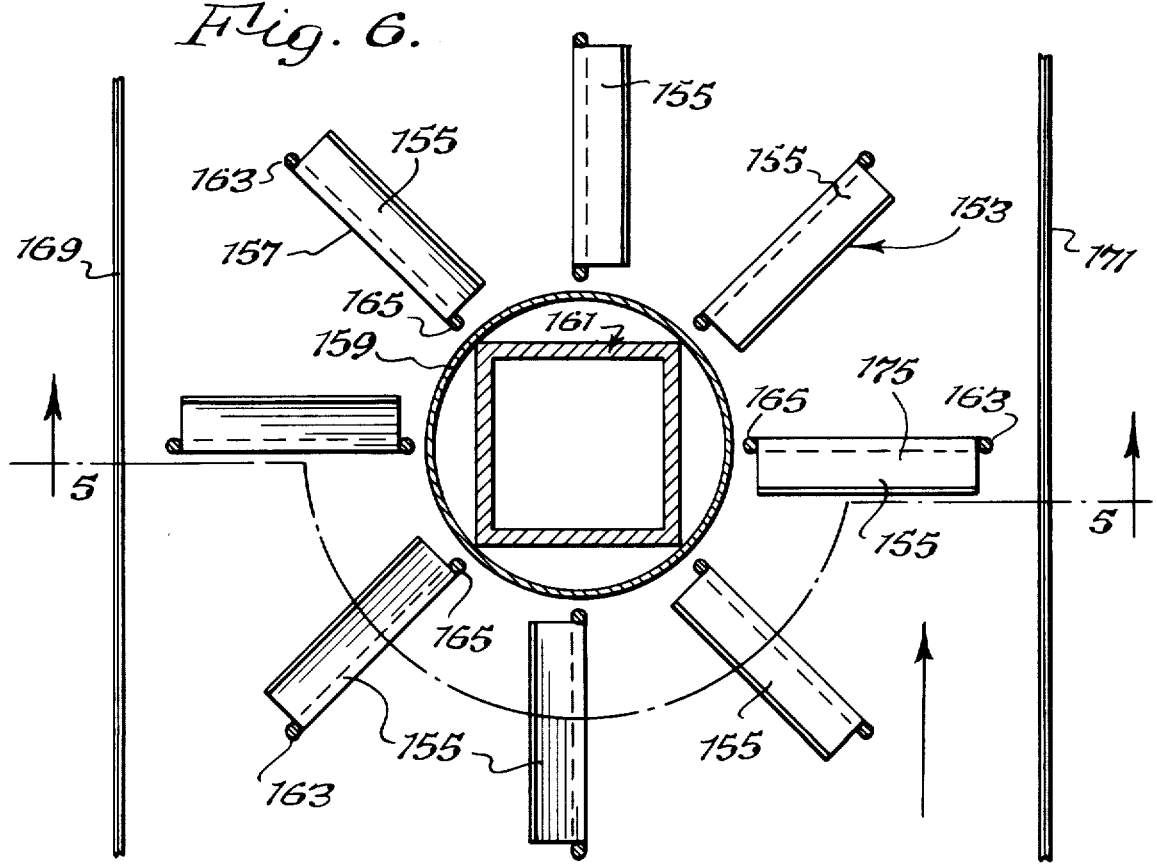
FIG. 6 is a partially sectioned partial to plan view of the modification of the windmill shown in FIG. 5.

In FIG. 3 there are illustrated the details of one of the vanes or sails of this invention. The air blocking portion 49 of vane 19 is suitably held within frame 51, as by fusion, stapling, cementing, screwing or nailing. As illustrated, surface 101, that contacted by the wind on the "power stroke", is of roughened material, e.g., burlap, coarse cloth, plastic or metal screening or cut foamed synthetic organic polymeric plastic whereas the opposite side 103, which faces the wind on the "return stroke", is smooth, e.g., of synthetic organic polymeric plastic film or sheet, such as polyethylene, polypropylene, polyvinyl chloride or polytetrafluoroethylene coated sheet material, to help to spill the wind. An additional feature of the vane structure, not illustrated, is in the use of a V-shape, preferably with the channel of the V being horizontal, or a plurality of such shapes with openings between, as shown in FIGS. 5 and 6, instead of a sheet of wind-blocking material. In such cases, of course, the inside of the V is of the coarser or rougher material and the external part thereof, designed to spill the wind, is smooth. In the preferred embodiment of the invention illustrated, the burlap or similar rough surface material is cemented or fused to the smooth polymer film to strengthen it against the action of the wind. However, it is within the invention to use smooth surfaces, as of polyethylene, for both sides of a vane.

Figure 4:
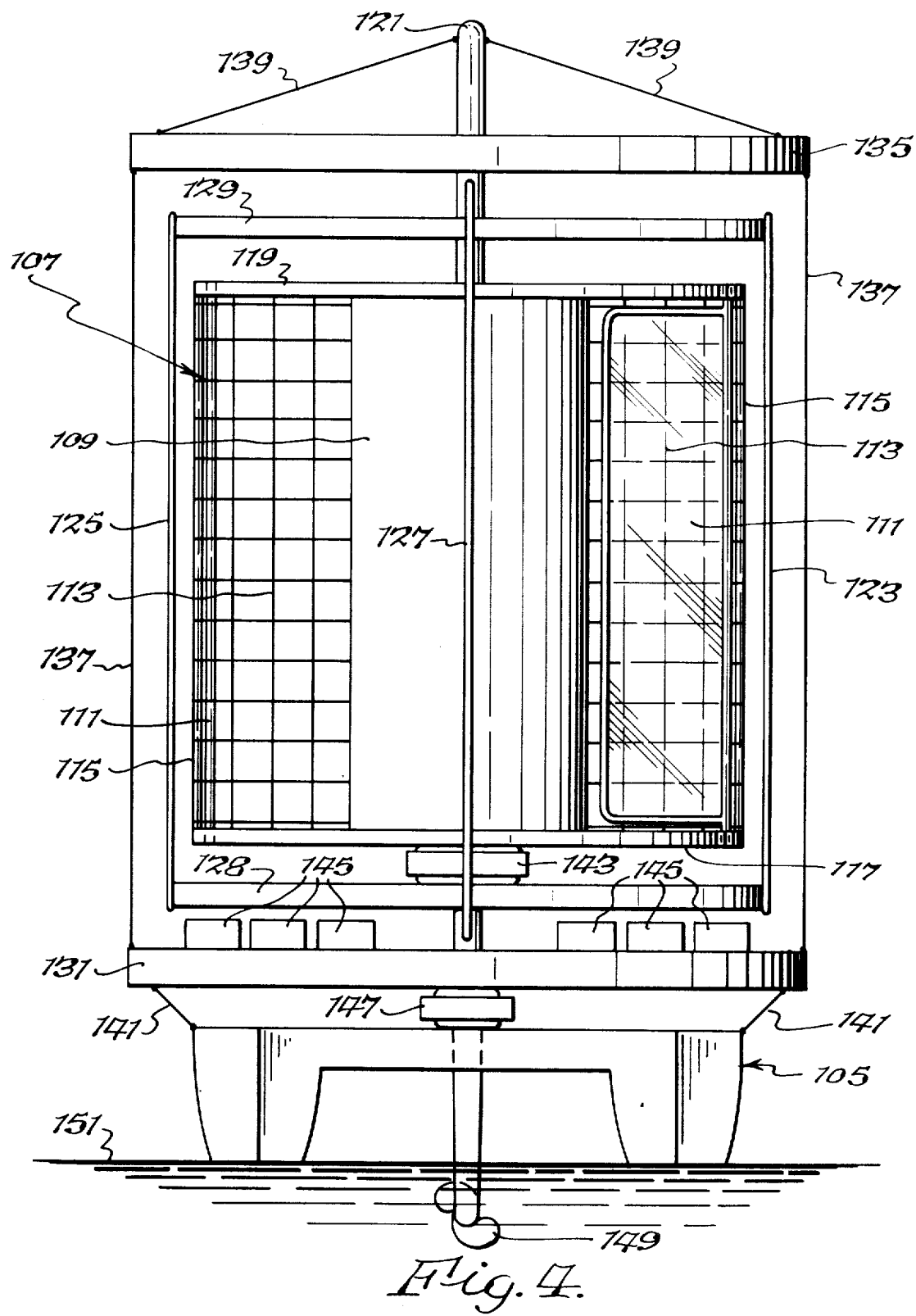
FIG. 4 is a vertical elevation of a catamaran viewed from the after end thereof with a windmill of the present invention located aft.

In FIG. 4 is shown an embodiment of the present invention wherein the horizontal windmill or a plurality thereof, e.g., two to six, is employed on a boat to drive it directly or preferably, to drive a generator which charges a battery which is capable of running a motor to drive boat propulsion means. Thus, when the boat is docked or in port its batteries may be charged by normal wind movement so that even if there is no wind when it is desired to operate it, the boat may still be used. Catamaran type boat 105 has horizontal windmill 107 positioned aft (the after quarter of the boat length) with its center on the boat center line. The mill includes internal tubular baffle 109, revolvable vanes 111, stop members 113 and 115, supports 117 and 119, a mast 121, about which the movable parts turn, external baffles 123 and 125 and fin 127, held together by members 128 and 129. Wheel-like structures 131 and 135 (which may be constructed like spoked bicycle wheels, as may be structures 128 and 129) are fixed (the other movable main structures are mounted on ball bearings) and comprise outer rim portions and spoke members connecting these to central collars or hubs to strengthen them. The hubs are joined to mast 121 and additional rigidity is given to the assembly by tension members 137, 139 and 141; including corresponding opposing members illustrated. It should be noted that tension members 137 are located along the entire peripheries of members 131 and 135 and provide a protective screen against a passenger on the boat accidentally touching the moving vanes.

In operation the horizontal windmill for the boat performs like that previously described in FIGS. 1-3. In fact if the boat includes a central member like that of the building it may be utilized for mounting the rest of the mill and if, in the case of the windmill of FIGS. 1-3, it is desired to mount such on a central mast or spindle and/or to utilize the "bicycle wheel" structure for supporting members this can be done satisfactorily. By utilizing mounting of the moving parts on a central shaft which rotates in bearings or on a collar about mast 121, not shown, the motion and power may be directly transmitted to a generator 143 which charges batteries 145 and/or operates motor 147 which turns a propellor 149 and powers boat 105 through the water 151 or along its surface. Of course, battery 145 or any bank of such batteries, as illustrated, can also operate motor 147 when generator 143 is not moving. In the embodiment illustrated moving parts may include the vanes, stop members, central tubular baffle and external baffles and the vanes and stop members may be fastened to the internal baffles. Alternatively, the internal baffles may be stationary. Instead of the generator being driven directly by movement of a shaft or collar operatively connected to the vanes it may be operated by gearing or frictional drives, as has been illustrated with respect to FIGS. 1 and 2. The illustrated vane structure may be replaced by horizontal channel structures such as those illustrated in FIGS. 5 and 6 and such structures may be rough surfaced on the wind side for the driving stroke and smooth surfaced on the opposite side for return movement. The channels or V's may be positioned radially, without feathering movement or may be provided with stops such as those of FIGS. 1 and 2, to control feathering thereof. Instead of electric batteries, other energy storing means, such as dynamic means (flywheels) and heat storage may be utilized and such energy may be reconverted to electrical and mechanical energy to drive propulsion means for the boat. Instead of employing the windmill on boats, larger versions thereof may be used, normally in multiples, as propulsion devices for ships.

In FIGS. 5 and 6 there is illustrated another embodiment of the invention wherein the horizontal windmill 153 includes a plurality of V-, channel- or trough-shaped vane members 155 mounted horizontally with the apex lines 157 of the V's being horizontal and with all such V's having the apex lines facing in the desired direction of rotation of the vane members 155. As illustrated, internal tubular baffle 159 is stationary and is fastened to supporting building 161, with the vanes being held to framework members 163 and 165, which maintain them spaced apart desired distances, both horizontally and vertically. In such spacings, normally it would be preferred to have the opening 166 between vane members at least 50%, e.g., 50 to 200%, preferably about 75 to 100%, of the heights of such vanes to provide sufficient room for spillage of wind on the return or no-power movement of the vanes. About the outer area of rotation of vanes 155 are external baffles 169 and 171 which, in combination with internal baffle 159, increase the wind velocity to the mill. Vanes 155 have roughened interior surfaces 173 and smooth external surfaces 175, the "interior" surfaces being those catching the wind and the "exterior" surfaces being those "spilling" the wind. The rough surfaces are preferably of cloth or similar material and the smooth surfaces are of smooth metal, plastic or other substitute, preferably as light in weight as feasible.

In modifications of the described embodiment of FIGS. 5 and 6 the central baffle may be mounted on a shaft and may rotate about it, with the various vanes being joined to it. Such a construction may avoid the need for external connecting members 165. In such an embodiment the mill would usually not be mounted on a building, although such a construction is possible in which the internal baffle and the other mill parts all rotate about the building. In a further embodiment of the invention the vanes may be pivoted, as are those of FIGS. 1–3, and may be stopped by stop members or screens, as in FIGS. 1 and 2, to promote maximum wind reception on the power portions of the revolutions and to cause desirable feathering on the no-power movements. In some less desirable embodiments of the invention the internal and external baffles may be omitted and the vanes may be mounted directly on a central revolving shaft or more preferably, on bearings mounted on a central stationary shaft.

The employment of roughened wind catching trough or concave surfaces and smooth peaked or convex wind deflecting surfaces allows the effective force developed by the wind to be several times that which would be exerted by the same wind on a flat smooth surface and accordingly, better production of power from the described windmills is obtainable.

In the various structures illustrated there are shown eight vanes but various numbers of vanes may be utilized, normally being at least four or six, preferably six to 24 and most preferably about seven to 12. The materials of the vanes may be synthetic organic polymeric plastic, e.g., polyethylene, polypropylene, polyvinyl chloride, fiberglass-reinforced polyester, polyterphthalate, etc., but aluminum, cotton, linen, wool and most preferably, synthetic organic polymeric plastic material cloths, e.g., nylon, polyester and blends, may also be employed. Preferably, the wind-facing surface on the power part of the sail or vane movement is roughened material, such as a nubby cloth and the other surface is of smooth plastic, e.g., polyethylene. The various structural materials employed are preferably of light weight materials, e.g., aluminum, plastics, organic fibrous materials or may be of heavier substances of which only very small weights are utilized, e.g., high strength thin stainless steel or other alloy wires and "bicycle wheel" frame and compression members of aluminum, fiberglass-reinforced polyester or thin, high-strength steel. Wherever possible tension members will be employed to strengthen compression members and maintain them in position and both such tension and compression members will be light in weight. When employing the internal and external baffles, as when the windmill is mounted about a building or similar structure it will be preferable that the path for the wind will have been decreased by the presence of the internal baffle to less than 80% of the cross-sectional area otherwise available (with the vanes and stop members removed) and preferably this space or path for the wind will be between 10 and 50% of the maximum path (without the internal baffle and enclosed building in position). Although in some aspects of the invention the internal baffle and sometimes too, the external baffle, may be omitted, to do so sacrifices the additional wind velocity generated by their presences.

Although in a preferred embodiment of the invention the windmill is mounted about a building, it is also possible to mount it about other pre-existing structures, e.g., transmission towers, utility poles, smoke stacks, silos, water towers and tanks. When the mills are mounted on buldings the internal baffle, if employed, will preferably be of transparent material so as not to obstruct light radiation to the building.

An important feature of the invention is the provision of positive holding of the rotating portion of the mill to supports for it so as to prevent its accidentally jumping off the track. However, the structure illustrated may be modified in various ways, as by replacement of the wheels with other low-friction surfaces, e.g., polytetrafluoroethylene coated surfaces. Nevertheless, it is preferred to employ light weight wheels, such as bicycle wheel structures, in the three-wheel arrangement illustrated in FIGS. 1 and 2.

The invention has been described with respect to various embodiments thereof but is to be understood that it is not limited to the embodiments illustrated since it would be evident that one of ordinary skill in the art, with the present specification before him, will be able to utilize substitutes and equivalents without departing from the spirit of the invention.

What is claimed is:

1. A horizontal windmill comprising a plurality of vanes, a substantially cylindrical internal baffle member fixedly mounted on and surrounding a vertical tower-shaped office building at a distance at least 10 meters above ground level, means for mounting and positioning the vanes about the substantially cylindrical baffle member for horizontal partial rotational movements thereof about vertical axes so as to place them in wind-resisting positions at substantially all times when moving with the wind and in feathered positions at substantially all times when moving against it, so as to promote horizontal revolution of the windmill when the wind blows, and a substantially vertical movable baffle which is straight sided, located outside the path of movements of the vanes and self-aligning so as to be maintained parallel to the direction of the wind, for increasing the wind speed, in conjunction with the substantially cylindrical internal baffle, as the wind is directed against the wind-resisting vanes, the location of which substantially vertical, straight sided baffle is such that the minimum free area through which the wind can flow between said baffle and the substantially cylindrical internal baffle, calculated without the vanes in place, is about 10 to 50% of the maximum of such free area and the rotating vanes are limited in travel by stop members which allow only about a 90° movement of the vanes between a radial position and a tangent position.

2. A horizontal windmill according to claim 1 wherein means for mounting and positioning the vanes is mounted on the building, the vertical baffle is mounted on the building for revolution thereabout and the vertical cylinder is transparent or translucent and is mounted about the building.

3. A horizontal windmill according to claim 2 wherein the vertical cylinder is transparent and stationary, two of the vertical baffles are provided on opposite sides of the building and the cylinder, held together so as both to be self-aligning in the direction of the wind, and fin means are joined to the baffles to assist in holding them parallel to the wind direction.

4. A horizontal windmill according to claim 3 comprising at least four vanes held together by rotatable connecting means, which connecting means is mounted on mounting means on the building, said mounting means including rigid horizontal members for supporting the connecting means and the plurality of vanes, and tension means, joined to the building to hold the mounting means firmly in place with respect to the building and to strengthen said mounting means.

5. A horizontal windmill according to claim 4 comprising at least six vanes of light weight synthetic organic polymeric plastic, with the means for mounting and positioning the vanes including wheels for supporting the connecting means on the mounting means and for holding it in desired position thereon during operation of the windmill, the vertical external baffles and fin means being of light weight synthetic organic polymeric plastic and the stop means being of a network structure.

6. A horizontal windmill according to claim 5 wherein there are from six to 24 vanes and the baffles extend above and below the vanes.

7. A horizontal windmill according to claim 6 wherein an electric generator is actuated by the revolving vanes.

8. A horizontal windmill comprising a plurality of vanes, a vertical tubular internal baffle member, substantially curviform in horizontal cross-section, fixedly mounted on and surrounding a building at a distance at least ten meters above ground level, means for mounting and positioning the vanes about the tubular baffle member for horizontal partial rotational movements thereof about vertical axes so as to place them in wind-resisting positions at substantially all times when moving with the wind and in feathered positions at substantially all times when moving against it, so as to promote horizontal revolution of the windmill when the wind blows, and a substantially vertical baffle, which is movable and self-aligning in the direction of the wind, located outside the path of movements of the vanes and being maintained parallel to the direction of the wind, for increasing the wind speed, in conjunction with the tubular internal baffle, as the wind is directed against the wind-resisting vanes, the location of which substantially vertical baffle is such that the minimum free area through which the wind can flow between such baffle and the tubular internal baffle, calculated without the vanes in place, is less than 80% of the maximum of such free area.

9. A horizontal windmill according to claim 8 wherein the vanes are V-shaped to catch the wind when moving with it and spill the wind when moving against it.

10. A horizontal windmill according to claim 9 wherein the sides of the vanes facing the wind when the vanes are moving with the wind are of a rough cloth and the opposite sides are of smooth synthetic organic polymeric plastic film, said cloth and film being joined together and said cloth strengthening said film.

11. A horizontal windmill according to claim 8 wherein the sides of the vanes facing the wind when the vanes are moving with the wind are of rougher surfaces than the opposite sides thereof.

12. A horizontal windmill according to claim 8 wherein the means for mounting and positioning the vanes include means for preventing them from being moved out of their desired paths.

13. A horizontal windmill according to claim 8 wherein the vanes are V-shaped to catch the wind when moving with it and spill the wind when moving against it, the sides of the vanes facing the wind when the vanes are moving with the wind are of a rough cloth and the opposite sides are of smooth synthetic organic polymeric plastic film, said cloth and film being joined together and said cloth strengthening said film.

14. A horizontal windmill according to claim 8 wherein the means for mounting and positioning the vanes include means for preventing motion of the vanes outside their desired paths, such means including supporting means for the vanes, opposed flanges at top and bottom of said supporting means and a plurality of 3-wheel structures, with the separate wheels thereof each bearing on the tops, ends and bottoms of said flanges to hold the vanes positively in desired relationships with the supporting means.

15. A horizontal windmill comprising a plurality of vanes, a vertical tubular internal baffle member, substantially curviform in horizontal cross-section, fixedly mounted on a tower-shaped office building at a distance at least 10 meters above ground level, means for mounting and positioning the vanes about the tubular baffle member for horizontal partial rotational movements thereof about vertical axes so as to place them in wind-resisting positions at substantially all times when moving with the wind and in feathered positions at substantially all times when moving against it, so as to promote horizontal revolution of the windmill when the wind blows, which means for mounting and positioning the vanes include means for preventing them from being moved out of their desired paths, which include supporting means for the vanes, opposed flanges on ends of said suporting means and a plurality of three-wheel structures, with separate wheels thereof each bearing on tops, ends and bottoms of said flanges to hold the vanes positively in desired relationships with the supporting means, and a substantially vertical baffle which is movable and self-aligning in the direction of the wind, located outside the path of movement of the vanes and being maintained parallel to the direction of the wind, for increasing the wind speed, in conjunction with the tubular internal baffle, as the wind is directed against the wind-resisting vanes, the location of which substantially vertical baffle is such that the minimum free area through which the wind can flow between such baffle and the tubular internal baffle, calculated without the vanes in place, is less than 80% of the maximum of such free area.

* * * * *